US009019072B2

(12) United States Patent
Ali et al.

(10) Patent No.: US 9,019,072 B2
(45) Date of Patent: Apr. 28, 2015

(54) PAIRING REMOTE CONTROLLER TO DISPLAY DEVICE

(71) Applicant: Dell Products, LP, Round Rock, TX (US)

(72) Inventors: Raziuddin Ali, Austin, TX (US); Abu Shaher Sanaullah, Austin, TX (US); Yuan-Chang Lo, Austin, TX (US); Claude L. Cox, Austin, TX (US); Karthikeyan Krishnakumar, Round Rock, TX (US)

(73) Assignee: Dell Products, LP, Round Rock, TX (US)

( * ) Notice: Subject to any disclaimer, the term of this patent is extended or adjusted under 35 U.S.C. 154(b) by 153 days.

(21) Appl. No.: 13/731,900

(22) Filed: Dec. 31, 2012

(65) Prior Publication Data

US 2014/0184385 A1 Jul. 3, 2014

(51) Int. Cl.
*G05B 19/00* (2006.01)
*G06F 15/177* (2006.01)
*G08C 17/02* (2006.01)

(52) U.S. Cl.
CPC ............ *G08C 17/02* (2013.01); *G08C 2201/20* (2013.01)

(58) Field of Classification Search
USPC ................ 340/5.5–5.6, 8.1, 10.1, 822, 825.1; 341/175–176; 348/222.1
See application file for complete search history.

(56) References Cited

U.S. PATENT DOCUMENTS 5,349,459 A 9/1994 Reed
5,955,981 A 9/1999 Rangan
6,253,980 B1 * 7/2001 Murakami et al. ............ 224/510
6,781,507 B1 8/2004 Birchfield et al.
7,116,229 B1 * 10/2006 Miramontes ............... 340/12.28
7,738,569 B2 6/2010 Quinn et al.
7,974,606 B2 7/2011 Lo et al.
2003/0189509 A1 * 10/2003 Hayes et al. .................. 341/176
2004/0070491 A1 * 4/2004 Huang et al. ................. 340/10.5
2009/0045970 A1 * 2/2009 Miyabayashi et al. ... 340/825.22
2009/0264098 A1 10/2009 Lo et al.
2010/0082784 A1 * 4/2010 Rosenblatt et al. ........... 709/222
2010/0123546 A1 * 5/2010 Seo et al. ..................... 340/5.51
2011/0223860 A1 9/2011 Lo et al.
2011/0267170 A1 * 11/2011 Huang ........................... 340/5.2
2011/0283276 A1 * 11/2011 Andrews et al. .............. 717/177
2012/0026078 A1 2/2012 Krishnakumar et al.
2012/0048935 A1 3/2012 Mundt et al.
2012/0200497 A1 * 8/2012 Nasiri et al. .................. 345/157

OTHER PUBLICATIONS

"Inside NFC: How Near Field Communication Works," Braue, David, APC Magazine, Aug. 17, 2011 http://apcmag.com/print.aspx?id=8070&mode=print.

* cited by examiner

*Primary Examiner* — Hai Phan
*Assistant Examiner* — Royit Yu
(74) *Attorney, Agent, or Firm* — Larson Newman, LLP

(57) ABSTRACT

A remote control device is authorized to command the presentation of information from an information presenting device by communicating with the information presenting device by a first mode of communications while the remote control device and the information presenting device are proximate. In response to the authorizing, the information presenting device is unlocked to permit the presentation of information in response to commands from the remote control device. After the unlocking, the information presenting device presents information in response to commands from the remote control device.

20 Claims, 3 Drawing Sheets

PAIRING REMOTE CONTROLLER TO DISPLAY DEVICE

FIELD OF THE DISCLOSURE

This disclosure generally relates to information handling systems, and more particularly relates to pairing a remote controller to an information-presenting device such as a projector.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements can vary between different applications, information handling systems can also vary regarding what information is handled, how the information is handled, how much information is processed, stored, or communicated, and how quickly and efficiently the information can be processed, stored, or communicated. The variations in information handling systems allow for information handling systems to be general or configured for a specific user or specific use such as financial transaction processing, airline reservations, enterprise data storage, or global communications. In addition, information handling systems can include a variety of hardware and software components that can be configured to process, store, and communicate information and can include one or more computer systems, data storage systems, and networking systems. Information systems may communicate information by displaying it on projectors and other video displays under the control of remote control devices.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be utilized in this application. The teachings can also be utilized in other applications and with several different types of architectures such as distributed computing architectures, client/server architectures, or middleware server architectures and associated components.

Figure 1:
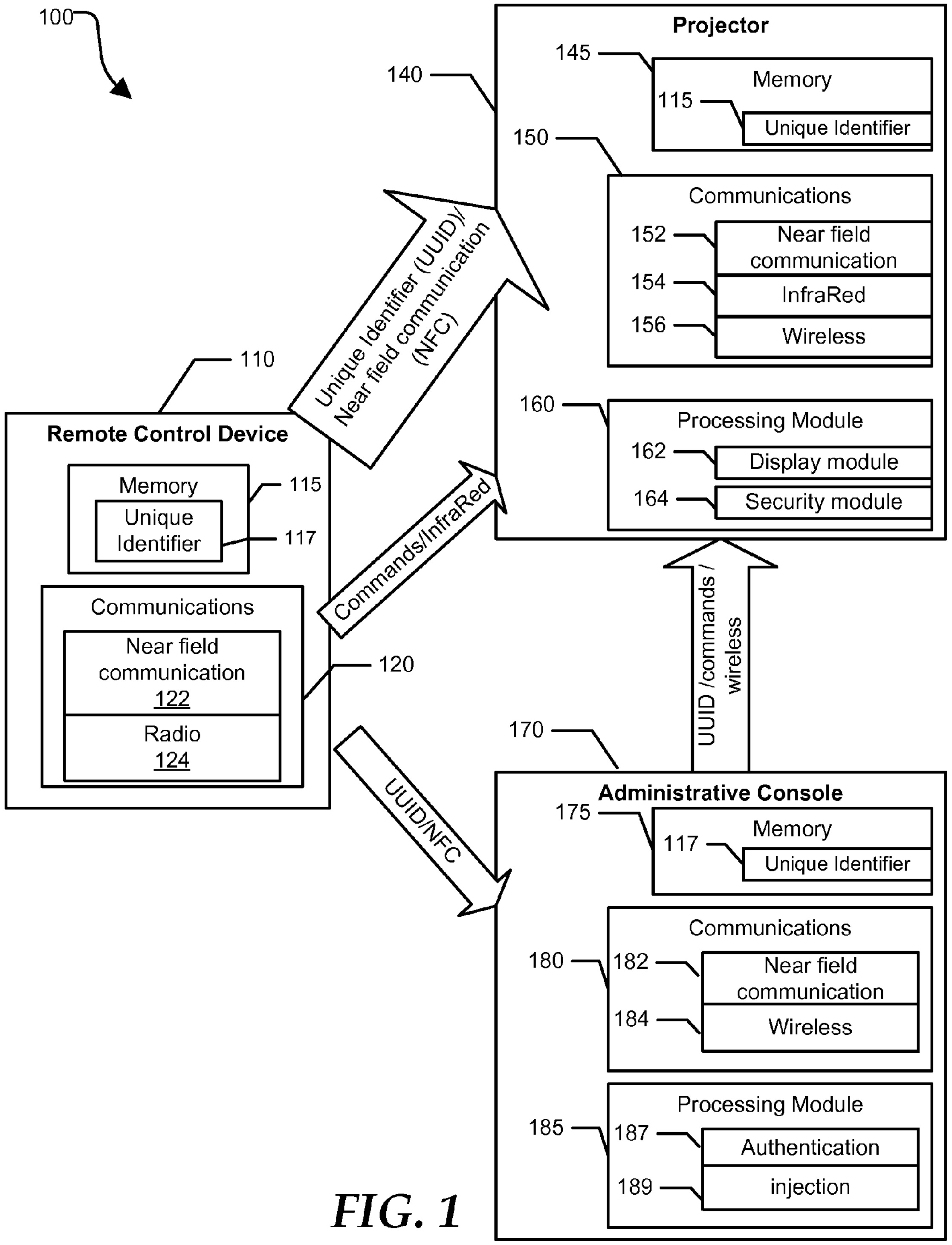
FIG. 1 illustrates a block diagram of a system to identify a remote control device to a projector according to one aspect of the disclosure.

FIG. 1 illustrates a system 100 to control the display of information by an information handling system. For purposes of this disclosure, an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system can be a personal computer, a PDA, a consumer electronic device, a network server or storage device, a switch router, wireless router, or other network communication device, or any other suitable device and can vary in size, shape, performance, functionality, and price. The information handling system can include memory, one or more processing resources such as a central processing unit (CPU) or hardware or software control logic. Additional components of the information handling system can include one or more storage devices, one or more communications ports for communicating with external devices as well as various input and output (I/O) devices, such as a keyboard, a mouse, and a video display. The video display may contain data useful for adjusting its color display. The information handling system can also include one or more buses operable to transmit communications between the various hardware components.

System 100 includes remote control device 110, projector 140, and administrative console 170. Remote control device 110 includes memory 115 and communications 120. Memory 115 stores unique identifier 117. Unique identifier 117 may consist of data that remote control device 110 presents to projector 140 to distinguish it from other remote control devices that communicate with projector 140. Unique identifier 117 may, for example, consist of a unique serial number for remote control device 110. Other unique items of data, such as a password, would also serve. In some embodiments, unique identifier 117 may be protected against attack. It may, for example, be stored in an encrypted form and decrypted for presentation to projector 140. In further embodiments, remote control device 110 and projector 140 may exchange keys or otherwise communicate security information. In many embodiments, unique identifier 117 may be write-protected; that is, the value of unique identifier 117 stored in memory 115 may not be overwritten by normal processes.

Communications module 120 includes near field communications 122 and radio communications 124. Near field communication (NFC) is a method by which smartphones and similar devices may establish radio communication with each other by bringing them into close proximity of each other, usually no more than a few inches. The bringing together to establish communications may be referred to as "tapping." An NFC device may also read an unpowered NFC chip, called a "tag." Radio communications may include infrared, Bluetooth, and other forms of radio communications between a remote control device and a display device such as projector 140. While some forms of radio communication may be line-of-sight, other forms of radio communication may operate between devices that are not in line-of-sight. Communications module 120 may enable remote control device 110 to communicate with projector 140 and administrative console 170. In the embodiment of FIG. 1, remote control device 110 communicates with projector 140 through both NFC communications and radio communications. Remote control device 110 also communicates with administrative console 170 through NFC.

Administrative console 170 contains memory 175, communications 180, and processing module 185. Administrative console 170 may include a laptop computer, a desktop computer, or any other information handling systems capable for communicating with a remote device, reading a unique identifier from the remote, storing the unique identifier, and transmitting the unique identifier to a projector. Memory 175 stores unique identifier 117. Remote control device 110 may "tap" or establish NFC communications with administrative console 170 and administrative console 170 may read unique identifier 117 from memory 115 of remote control device 110 and store unique identifier 117 in memory 115.

In some embodiments, administrative console 170 may be password protected, to restrict the users who have access to unique identifier 117. In some embodiments, unique identifier 117 may be programmable through administrative console 170. In those embodiments, it would be unnecessary to read unique identifier 117 by tapping remote control device 110.

Communications 180 includes NFC 182 and wireless communications 184. Administrative console 170 may communicate with projector 140 through wireless communications. The communications may configure projector 140 for proper operation, and may include transmitting unique identifier 117 to projector 140. The communications between administrative console 170 and projector 140 may also include the transmission of lock and unlock commands and commands to change default projector settings, security levels, and company network settings if the projector is network connected. The network settings may include the Service Set Identifier (SSID), a name of a wireless local area network needed for communication by nodes in the network, and other connectivity information required for the projector to behave as an access point.

Projector 140 includes memory 145, communications module 150, and processing module 160. A projector may project images onto a flat surface, and may include video projectors, movie projectors, and slide projectors. Video and movie projectors may also play audio portions of videos and movies. Memory 145 stores unique identifier 117. Communications module 150 includes NFC 152, infrared 154, and wireless module 156. Projector 140 may communicate with remote control device 110 through both NFC and infrared. The infrared communications may include commands from remote control device 110 for the presentation of information, and the NFC communications may include tapping the projector to allow it to read unique identifier 117.

Projector 140 may communicate with administrative console 170 through wireless module 156. Processing module 160 may perform processing operations and includes display module 162 that executes commands to display materials. Processing module 160 includes a security module 164 to secure unique identifier 115. Security module 164 may exchange cryptographic keys and other security information with remote control device 110, and may verify a signature or decrypt an encrypted unique identifier by using a key exchanged with remote control device 110. In other embodiments, when the unique identifier is not secured, security module 164 may be omitted.

In the embodiment of FIG. 1, projector 140 may be paired with remote control device 110 to display data under the control of remote control device 110 and as configured by administrative console 170. To prevent the display of sensitive material, administrative console 170 may lock projector

140 to prevent it from displaying data unless accessed by remote control device 110. The locking may be done through wireless communications between projector 140 and administrative console 170. To pair remote control device 110 and projector 140, unique identifier 117 is transmitted from remote control device 110 to projector 140. The transmission may occur in steps. First, remote control device 110 may tap administrative console 170 to enable it to read unique identifier 117. Administrative console 170 may then transmit unique identifier 117 to projector 140 through wireless communications 156. As a result, projector 140 holds unique identifier 117.

To command the display of information from projector 140, remote control device 110 may identify itself to projector 140 to verify that it is the device authorized to command the display of the sensitive information. The identification may consist of tapping projector 140 to transmit its unique identifier to projector 140. Projector 140 may compare the unique identifier of remote control device 110 with the unique identifier it received from administrative console 170. If the two match, the projector 140 may unlock itself to permit itself to be commanded to display information by remote control device 110. In some embodiments, projector 140's identification of remote control device 110 may involve the use of security mechanisms. Projector 140 may exchange keys with or otherwise communicate security information to remote control device 110 and may decrypt data supplied by remote control device 110.

In some embodiments, remote control device 110 may mediate between projector 140 and administrative console 170. Remote control device 110, projector 140, and administrative console 170 may be located in a commercial site with many rooms. There may be multiple projectors located in separate rooms. Each may be controlled by a separate device. In further embodiments, it may be difficult to access the projectors. They may, for example, be wireless projectors mounted on the ceiling. In this situation, it may be difficult to control a projector 140 directly from administrative console 170. Administrative console 170 may, for example, be located in a separate room, out of sight of the display from projector 140. A speaker in the room with projector 140 would then be unable to use administrative console 170 to control the display of materials from projector 140. Similarly, multiple speakers may be giving presentations simultaneously in separate rooms. Again, administrative console 170 could not be used to directly control all of the projectors involved. In these and similar circumstances, a remote such as remote 110 may be used to control a projector, such as projector 140. By registering a unique identification of the remote with the projector through the administrative control and by identifying the remote to the projector by tapping, the remote can be used to directly control the actions of the projector while maintaining the security of the information being displayed.

In the example of FIG. 1, the administrative console and the projector were separate devices. In other embodiments, the administrative console may be a component of the projector. In some embodiments of FIG. 1, remote control device 110 may be uniquely paired to projector 140; that is, remote control device 110 is the only remote that projector 140 will recognize. In other embodiments, projector 140 may recognize multiple remotes, either one at a time, as administrative console 170 replaces a unique identifier of one remote with a unique identifier of another remote in projector 140, or simultaneously.

In other embodiments, the remote control device may be any device capable of commanding the display of information, including a laptop, a mobile phone, a tablet computer, a web computer, and a net book. In the embodiment of FIG. 1, a projector displayed information under the control of a remote control device. In other embodiments, other types of devices may display or otherwise present (reveal, divulge, release) information under the control of a remote-control device. The other devices may include, but are not limited to, monitors, televisions, DVD and Blu-ray players, devices that play audio such as radios, and printers.

In other embodiments, an information-presenting device may verify or confirm the identity of a remote control device by other identification processes which require the remote control device to be brought within close proximity of the device. One form of identification may utilize short-range communications. For the purpose of this disclosure, "short-range wireless communications technology" refers to any suitable communications transport, protocol, and/or standard allowing two or more suitably-configured devices to communicate via wireless transmissions provided that such devices are within approximately one meter of each other. Examples of short-range communications technologies include, without limitation, BLUETOOTH Class 3, radio frequency identification (RFID), proximity card, vicinity card, ISO 14443, ISO 15693, and other suitable standards. In a few embodiments, the remote control device may be verified by a bar code reader or other form of scan to read an identification from the remote control device. In further embodiments, the verification may be performed by the administrative console or a scanning device attached to the administrative console. In several embodiments, an administrator may read a serial number or other identification from the remote control device and manually enter it into the information-presenting device on a user-interface component of the device. Alternatively, the administrator may enter the information into the administrative console and transmit it to the device.

Figure 2:
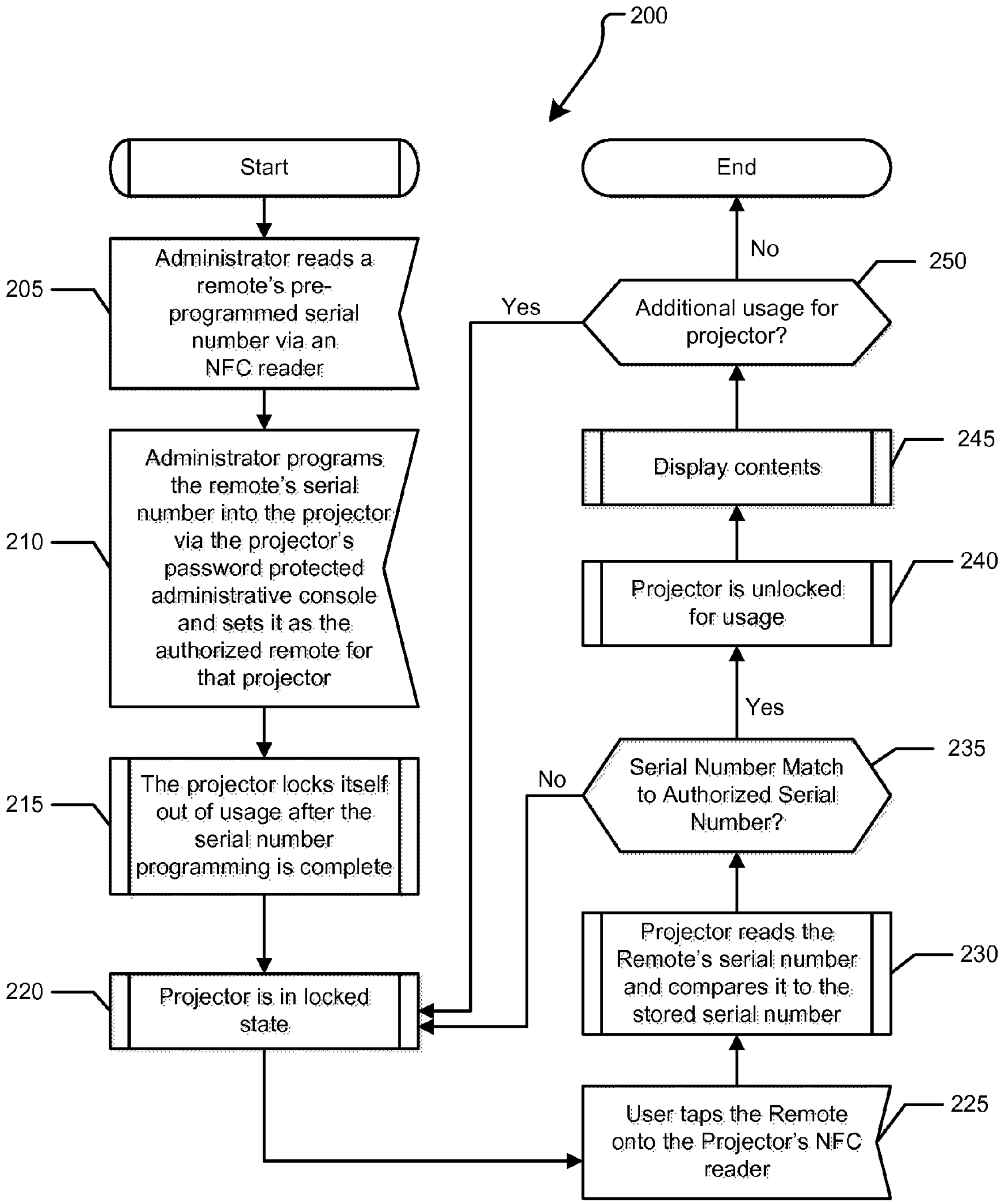
FIG. 2 is a flowchart illustrating a method of identifying a remote control device to a projector according to one aspect of the disclosure.

FIG. 2 shows a method 200 of authorizing a remote control device to command the presentation of information from an information-presenting device. The remote control device may be remote control device 100 of FIG. 1 and the information-presenting device may be projector 140 of FIG. 1. Method 200 begins at block 205 with an administrator reading a pre-programmed serial number via a near-field communication reader from a remote control device. The serial number may be stored on a tag. In some embodiments, the serial number may be signed, encrypted, or otherwise secured. At block 210, the administrator programs the serial number into the information-presenting device's internal storage. The programming may be performed via a password protected administrative console, such as administrative console 170 of FIG. 1. At block 215, the administrator locks the information-presenting device to prevent it from presenting information under control of a remote control device unless the remote control device is authorized. As a result, at block 220 the projector is in a locked state.

At block 225, a user taps the remote control device's near-field communication element onto the projector's near-field communication reader. The tapping establishes near-field communications between the remote control device and the projector. At block 230, the projector reads an identifier from the remote control device and matches it with the stored serial number to check for an authorized remote control device. In some embodiments, the identifier may be signed or otherwise protected, and the matching may involve verifying the signature, decrypting the identification, or otherwise generating a plain-text version of the identifier.

At block 235, the results of the match are analyzed. If the stored serial number does not matches the identifier, then the method returns to block 220, with the projector in a locked state and awaiting presentation of a remote control device with the proper serial number. If there is a match, at block 240 the projector is unlocked for use. At block 245, the projector displays contents under the command of the remote control device. The commands may involve a means of communication other than near-field communications, such as infrared. In some means of communication, the projector and remote-control device may be outside of line-of-sight of each other.

When a session of the projector's displaying information under the command of a remote control device is complete, at block 250 a determination is made whether to use the projector for other displays of information. A session may be complete upon a lapse of time from the start of a session, upon a lapse of time from the last command to present information, upon the ending of communications between the remote control device and the projector, or upon receipt of a message that the session is complete. The message may be transmitted by the remote control device or the administrative console. If the projector will be used for further displays of information, the projector is returned to a locked state at block 220 to await authentication of a remote control device. The return to the locked state may be automatic upon completion of a session, or may be in response to a command from the remote control device or from an administrative console to return to a locked state. Otherwise, if the projector will not be used again, the method of block 200 ends.

Other embodiments of FIG. 2 may involve information-presenting devices other than a projector, such as an audio player. In some embodiments, the unique identifier may be a password or other security token, rather than a serial number. In many embodiments, the administrator may read the unique identifier from a remote control device's documentation, rather than by using a near-field communication reader. In some embodiments, a projector or other information-presenting device may be authorized with multiple remote control devices and may store multiple identifiers. In a few embodiments, an administrator may program a unique identifier of a remote control device directly into the information-presenting device rather than using an administrative console as an intermediary device. In further embodiments, the information-presenting device may possess the functionality of an administrative console. An administrator may, for example, be required to present a password before gaining access to the information-presenting device to store a unique identifier of an authorized remote control device.

In other embodiments, a means of communication other than near-field communications may be used to transmit the unique identifier from the remote control device to the information-presenting device. The means may include short-range communications or other communications involving proximity of the remote control device to the information-presenting device. In a few embodiments, after the remote control device has identified itself to the information-presenting device through the near-field communications or other communications involving proximity, the information-presenting device verifies that it is receiving commands from the identified remote control device through the second means of communication. In further embodiments, the remote control device may append the unique identifier or some other identifier to each remote-issued command. The information-presenting device may not obey remote-issued commands unless it recognizes the identifier in the command.

In other embodiments, a projector or other information-presenting device may be left in an unlocked state if the information it is to display or otherwise present is not confidential. In a further embodiment, a user may enter a pin number into the remote before use. The pin may be written as an extension of the data field read by the projector upon remote tap. The pin number may be matched to the projector's stored equivalent. Alternatively, if the projector is network connected, it can match the pin back to the company's authentication system. A tap that communicates a matched pin may unlock the projector and leave it unlocked. The unlocked period may have a longer duration than a normal timeout until relocking, or the unlocked period may extend until user action to lock the projector again. A tap without a pin number to produce the unlocked state may result in the behavior described in FIG. 2, of unlocking the projector only for the presentation of information during a session.

Figure 3:
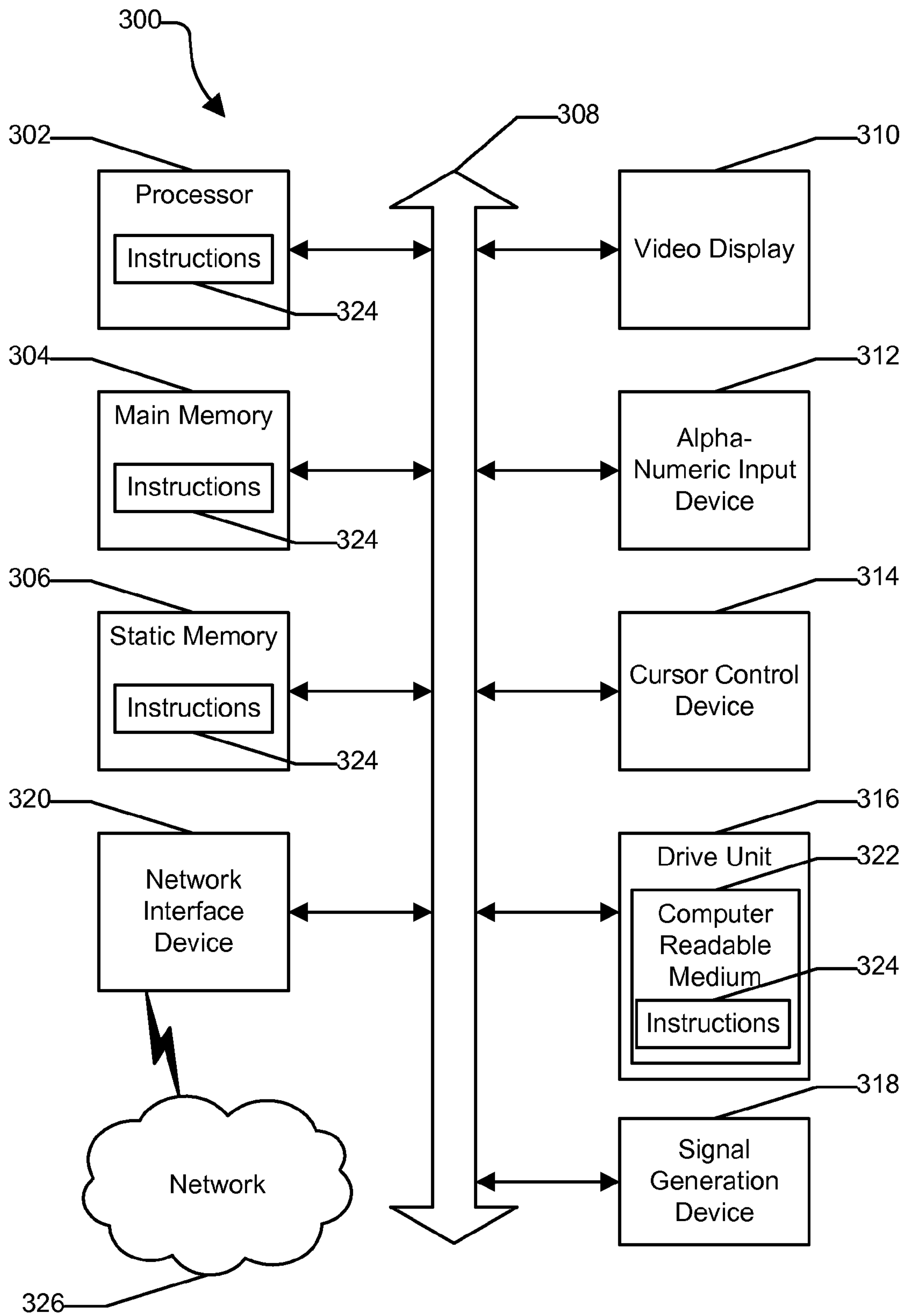
FIG. 3 illustrates a block diagram of an information handling system according to one aspect of the disclosure.

FIG. 3 illustrates a block diagram of an exemplary embodiment of an information handling system, generally designated at 300. In one form, the information handling system 300 can be a computer system such as a server. As shown in FIG. 3, the information handling system 300 can include a first physical processor 302 coupled to a first host bus 304 and can further include additional processors generally designated as $n^{th}$ physical processor 306 coupled to a second host bus 308. The first physical processor 302 can be coupled to a chipset 310 via the first host bus 304. Further, the $n^{th}$ physical processor 306 can be coupled to the chipset 310 via the second host bus 308. The chipset 310 can support multiple processors and can allow for simultaneous processing of multiple processors and support the exchange of information within information handling system 300 during multiple processing operations.

According to one aspect, the chipset 310 can be referred to as a memory hub or a memory controller. For example, the chipset 310 can include an Accelerated Hub Architecture (AHA) that uses a dedicated bus to transfer data between first physical processor 302 and the $n^{th}$ physical processor 306. For example, the chipset 310, including an AHA enabled-chipset, can include a memory controller hub and an input/output (I/O) controller hub. As a memory controller hub, the chipset 310 can function to provide access to first physical processor 302 using first bus 304 and $n^{th}$ physical processor 306 using the second host bus 308. The chipset 310 can also provide a memory interface for accessing memory 312 using a memory bus 314. In a particular embodiment, the buses 304, 308, and 314 can be individual buses or part of the same bus. The chipset 310 can also provide bus control and can handle transfers between the buses 304, 308, and 314.

According to another aspect, the chipset 310 can be generally considered an application specific chipset that provides connectivity to various buses, and integrates other system functions. For example, the chipset 310 can be provided using an Intel® Hub Architecture (IHA) chipset that can also include two parts, a Graphics and AGP Memory Controller Hub (GMCH) and an I/O Controller Hub (ICH). For example, an Intel 320E or 315E chipset, or any combination thereof, available from the Intel Corporation of Santa Clara, Calif., can provide at least a portion of the chipset 310. The chipset 310 can also be packaged as an application specific integrated circuit (ASIC).

The information handling system 300 can also include a video graphics interface 322 that can be coupled to the chipset 310 using a third host bus 324. In one form, the video graphics interface 322 can be an Accelerated Graphics Port (AGP) interface to display content within a video display unit 326. Other graphics interfaces may also be used. The video graphics interface 322 can provide a video display output 328 to the video display unit 326. The video display unit 326 can include one or more types of video displays such as a flat panel display (FPD) or other type of display device.

The information handling system 300 can also include an I/O interface 330 that can be connected via an I/O bus 320 to the chipset 310. The I/O interface 330 and I/O bus 320 can include industry standard buses or proprietary buses and respective interfaces or controllers. For example, the I/O bus 320 can also include a Peripheral Component Interconnect (PCI) bus or a high speed PCI-Express bus. In one embodiment, a PCI bus can be operated at approximately 66 MHz and a PCI-Express bus can be operated at approximately 328 MHz. PCI buses and PCI-Express buses can be provided to comply with industry standards for connecting and communicating between various PCI-enabled hardware devices. Other buses can also be provided in association with, or independent of, the I/O bus 320 including, but not limited to, industry standard buses or proprietary buses, such as Industry Standard Architecture (ISA), Small Computer Serial Interface (SCSI), Inter-Integrated Circuit ($I^2C$), System Packet Interface (SPI), or Universal Serial buses (USBs).

In an alternate embodiment, the chipset 310 can be a chipset employing a Northbridge/Southbridge chipset configuration (not illustrated). For example, a Northbridge portion of the chipset 310 can communicate with the first physical processor 302 and can control interaction with the memory 312, the I/O bus 320 that can be operable as a PCI bus, and activities for the video graphics interface 322. The Northbridge portion can also communicate with the first physical processor 302 using first bus 304 and the second bus 308 coupled to the $n^{th}$ physical processor 306. The chipset 310 can also include a Southbridge portion (not illustrated) of the chipset 310 and can handle I/O functions of the chipset 310. The Southbridge portion can manage the basic forms of I/O such as Universal Serial Bus (USB), serial I/O, audio outputs, Integrated Drive Electronics (IDE), and ISA I/O for the information handling system 300.

The information handling system 300 can further include a disk controller 332 coupled to the I/O bus 320, and connecting one or more internal disk drives such as a hard disk drive (HDD) 334 and an optical disk drive (ODD) 336 such as a Read/Write Compact Disk (R/W CD), a Read/Write Digital Video Disk (R/W DVD), a Read/Write mini-Digital Video Disk (R/W mini-DVD), or other type of optical disk drive.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information presenting device comprising:
- a memory to store data and to store a unique identifier of a remote control device; and
- a communications component to read an identifier from the remote control device and to receive commands from the remote control device to present at least a portion of the data, wherein:
  - the information presenting device is to:
    - compare the read identifier and the stored unique identifier; and
    - unlock the information presenting device to present the at least a portion of the data in response to commands from the remote control device upon determining that the read identifier is a match to the stored unique identifier; and the communications component is to receive the unique identifier from an administrative console.

2. The information presenting device of claim 1, wherein the information presenting device is further to protect the stored unique identifier and to verify that the read identifier matches the unique identifier.

3. A system comprising:

the information presenting device of claim 1; and the administrative console to authorize a user to store the unique identifier in the memory and to lock the information presenting device until the communications component reads the unique identifier from the remote control device.

4. The information presenting device of claim 1, wherein the communications component is to read the identifier from the remote control device by a first mode of communications, the first mode comprising close-range communications, and to receive the commands from the remote control device to present the at least a portion of the data by a second mode of communications.

5. The information presenting device of claim 4, wherein the close-range communications constitutes near-field communications.

6. The information presenting device of claim 4, wherein the second mode of communications constitutes infrared communications.

7. The information presenting device of claim 4, wherein the communications component is to receive the unique identifier from the administrative console by a third mode of communications, the third mode of communications constituting wireless communications.

8. A remote control device comprising:

a memory to store a unique identifier; and a communications component to transmit the unique identifier to an information presenting device, to issue commands to the information presenting device for the presentation of information, and to transmit the unique identifier to the administrative console, wherein the information-presenting device is to receive a second identifier from an administrative console, to match the second identifier transmitted by the administrative console with the unique identifier transmitted by the remote control device, and to unlock itself for the presentation of information in case of a match.

9. The remote control device of claim 8, wherein the unique identifier is signed.

10. A system comprising:

the remote control device of claim 8;

the administrative console to transmit the unique identifier to the information presenting device; and the information presenting device.

11. The remote control device of claim 8, wherein the memory is write-protected.

12. The remote control device of claim 8, wherein the communications component is to transmit the unique identifier to the information presenting device by close-range communications and to issue the commands to the information presenting device for the presentation of information by a mode of communication other than close-range communications, the other mode of communication being longer-range than the close-range communications.

13. A method comprising:

storing a unique identifier in a remote control device;

registering the unique identifier with an information presenting device;

authorizing the remote control device to command the presentation of information from the information presenting device, the authorizing including communicating between the remote control device and the information presenting device and the authorizing including the remote control device communicating the stored unique identifier to the information presenting device and the information presenting device matching the communicated unique identifier to the registered unique identifier;

unlocking the information presenting device to present information in response to the authorizing;

after the unlocking, transmitting commands to present information from the remote control device to the information presenting device by a second mode of communications; and presenting information by the information presenting device in response to the commands, wherein the registering comprises:

the remote control device transmitting the unique identifier to an administrative console; and the administrative console writing the unique identifier to the information ion presenting device.

14. The method of claim 13, wherein:

the administrative console is password protected; and the writing comprises gaining access to the administrative console by means of a password.

15. The method of claim 13, wherein the authorizing comprises verifying a signature of the unique identifier.

16. The method of claim 13, wherein the storing comprises:

signing the unique identifier; and storing the unique identifier in a write-protected memory of the remote control device.

17. The method of claim 13, further comprising locking the information presenting device from the presentation of information until the authorization of the remote control device.

18. The method of claim 17, further comprising relocking the information presenting device after a completion of a session of presenting information in response to the commands from the remote control device.

19. The method of claim 13, wherein:

the authorizing includes communicating between the remote control device and the information presenting device by a first mode of communications while the remote control device and the information presenting device are proximate; and the transmitting commands to present information includes transmitting commands to present information from the remote control device to the information presenting device by a second mode of communications.

20. The method of claim 19, wherein:

the information presenting device is a projector;

the remote control device is a remote control device for the projector;

the first mode of communications is near-field communications; and the second mode of communications is infrared.

* * * * *